US006789459B2

(12) United States Patent
Sano et al.

(10) Patent No.: US 6,789,459 B2
(45) Date of Patent: Sep. 14, 2004

(54) HIGH-PRESSURE FUEL PUMP

(75) Inventors: Masaaki Sano, Nagoya (JP); Kazuhiro Asayama, Nagoya (JP); Hiroshi Inoue, Chiryu (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 70 days.

(21) Appl. No.: 10/257,714

(22) PCT Filed: Apr. 17, 2001

(86) PCT No.: PCT/JP01/03261

§ 371 (c)(1),
(2), (4) Date: Oct. 16, 2002

(87) PCT Pub. No.: WO01/79698

PCT Pub. Date: Oct. 21, 2001

(65) Prior Publication Data

US 2003/0136260 A1 Jul. 24, 2003

(30) Foreign Application Priority Data

Apr. 18, 2000 (JP) ....................................... 2000-116422

(51) Int. Cl.[7] ................................................ F16J 15/18
(52) U.S. Cl. ......................................................... 92/168
(58) Field of Search ............................ 92/168; 277/435, 277/436, 437, 438, 470, 560

(56) References Cited

U.S. PATENT DOCUMENTS

| | | | |
|---|---|---|---|
| 5,567,134 A | 10/1996 | Inoue | 417/490 |
| 5,752,430 A | 5/1998 | Kawajiri et al. | 92/129 |

FOREIGN PATENT DOCUMENTS

| | | |
|---|---|---|
| JP | 04-353262 | 12/1992 |
| JP | 11-082238 | 3/1999 |
| JP | 11-153069 | 6/1999 |
| JP | 2001-050174 | 2/2001 |
| JP | 2001-055963 | 2/2001 |
| WO | WO00/47888 | 8/2000 |

*Primary Examiner*—Edward K. Look
*Assistant Examiner*—Michael Leslie

(57) ABSTRACT

A high pressure fuel pump includes a cylinder having a pressurizing chamber and a plunger inserted into the cylinder. The plunger is axially reciprocated by a lifter to pressurize fuel in the pressurizing chamber. A seal member encompasses a portion of the plunger that is projected from the cylinder. The seal member disconnects a cylinder side space surrounded by the seal member from a lifter side space outside the seal member. The seal member has an annular lip portion that contacts a peripheral surface of the plunger, and the annular lip portion has a pair of lips separated from each other in an axial direction of the plunger. An axial distance between the lips is greater than a stroke of the plunger. As a result, fuel does not enter the lifter side space, and lubricating oil does not enter the cylinder side space.

6 Claims, 3 Drawing Sheets

HIGH-PRESSURE FUEL PUMP

BACKGROUND OF THE INVENTION

The present invention is related to a high pressure pump for pressurizing and supplying fluid, and more particularly, to a high pressure pump that is optimal for pressurizing and supplying fuel to a fuel injection valve of a vehicle engine.

Japanese Laid-Open Publication No. 8-68370 discloses a high pressure fuel pump used for a vehicle engine. The high pressure fuel pump has a cylinder, a plunger that is inserted into the cylinder, and a lifter that moves the plunger axially direction with respect to the cylinder. As the plunger reciprocates, the plunger pressurizes fuel in a pressurizing chamber, which is defined in the cylinder, and discharges the fuel from the pressurizing chamber.

The lifter contacts one end of the plunger that is projected from the cylinder. The lifter is slidably supported by a pump housing. A generally cylindrical seal member is attached to the cylinder so as to surround the portion of the plunger that is projected from the cylinder. The seal member has an annular lip portion defined at its distal end. The annular lip portion contacts an outer peripheral surface of the plunger. The seal member prevents fuel, which leaks from the pressurizing chamber through a clearance between the cylinder and the plunger from mixing with lubricating oil that lubricates the lifter.

FIGS. 4(*a*) and 4(*b*) are cross sectional views of a plunger 43 and a seal member 41. Although not shown, a cylinder is positioned upward of FIGS. 4(*a*) and 4(*b*), and a lifter is positioned downward of FIGS. 4(*a*) and 4(*b*). The seal member 41 disconnects a cylinder side space (the space surrounded by the seal member 41) from a lifter side space (the space outside the seal member 41). The lip portion 42 of the seal member 41 has an upper lip 42*a* and a lower lip 42*b* that are spaced from each other in the axial direction of the plunger 43. The upper lip 42*a* prevents fuel L1 collected on the peripheral surface of the plunger 43 from entering the lifter side space. The lower lip 42*b* prevents that lubricating oil L2 invades into the cylinder side space. Therefore, fuel and lubricating oil are prevented from mixing.

When the plunger 43 moves in a direction projecting out of the cylinder, that is, when the plunger 43 moves downward in FIG. 4(*a*), the fuel L1 collected on the peripheral surface of the plunger 43 is removed by the upper lip 42*a*. The removed fuel L1 is stored in the cylinder side space and prevented from entering the lifter side space. On the other hand, when the plunger 43 moves in a direction entering the cylinder, that is, when the plunger 43 moves upward in FIG. 4(*a*), the lubricating oil L2 collected on the peripheral surface of the plunger 43 is removed by the lower lip 42*b* and prevented from entering the cylinder side space.

However, it is difficult to completely remove the fuel L1 and the lubricating oil L2 collected on the plunger 43 by the lip portion 42. Therefore, in the high pressure fuel pump of the above publication, the mixing of the fuel and the lubricating oil is not sufficiently prevented. When the fuel leaks into the lifter side space and mixes with the lubricating oil, the lubricating oil is diluted and the lifter cannot be lubricated sufficiently.

When the plunger 43 moves from the highest position shown in FIG. 4(*a*) to the lowest position shown in FIG. 4(*b*), the fuel L1' that is not removed by the upper lip 42*a* temporarily enters the space between the upper lip 42*a* and the lower lip 42*b* and then passes by the lower lip 42*b* to leak into the lifter side space.

When the plunger 43 moves from the lowest position shown in FIG. 4(*b*) to the highest position shown in FIG. 4(*a*), the lubricating oil that is not removed by the lower lip 42*b* temporarily enters the space between the upper lip 42*a* and the lower lip 42*b* and passes by the upper lip 42*a* to leak into the cylinder side space.

As the stroke of the plunger 43 lengthens to increase the discharged amount of the fuel, the leakage amount of the fuel and the lubricating oil increases.

BRIEF SUMMARY OF THE INVENTION

It is an object of the present invention to provide a high pressure pump for that guarantees prevention of fluid leakage from one of two spaces, which are disconnected by a seal member, into the other one of the two spaces.

To achieve the above object, a high pressure pump includes a cylinder having a pressurizing chamber. A plunger is inserted in the cylinder. The plunger is axially reciprocated with a predetermined stroke to pressurize fluid in the pressurizing chamber. The plunger has a projected portion projected from the cylinder. A drive member drives the projected portion to reciprocate the plunger. A seal member encompasses the projected portion. The seal member has an annular lip portion that contacts a peripheral surface of the projected portion. The annular lip portion has a pair of lips separated from each other in an axial direction of the plunger. An axial distance between the lips is greater than the stroke of the plunger.

DETAILED DESCRIPTION

Figure 1:
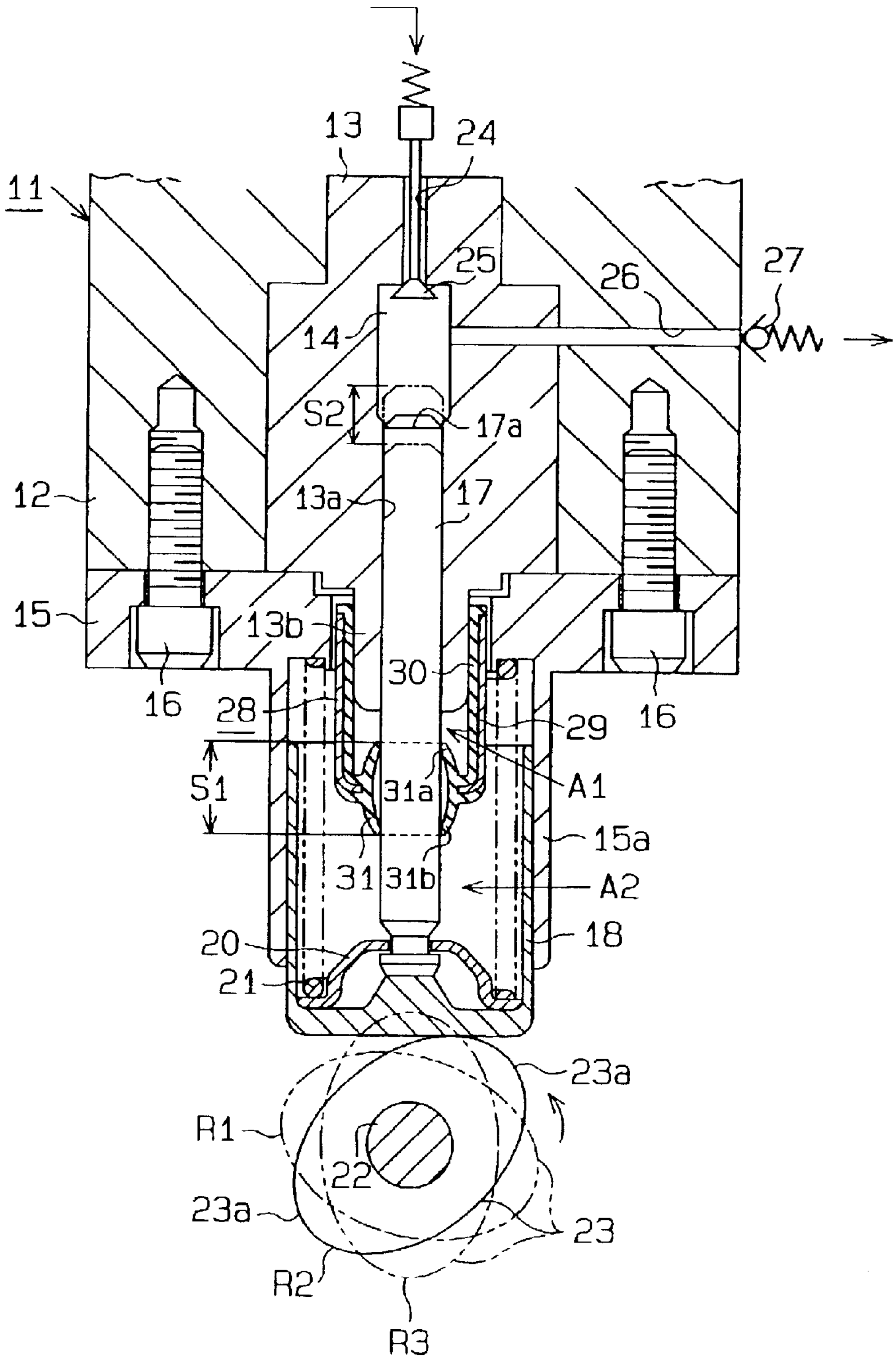
FIG. 1 is a cross sectional view of a high pressure fuel pump according to an embodiment of the present invention.

A high pressure pump according to the present invention embodied in a high pressure fuel pump 11 that is applied to a vehicle engine will now be discussed with reference to FIGS. 1 to 3. Although not shown in the drawings, the high pressure fuel pump 11 of FIG. 1 pressurizes fuel, which is sent from a fuel tank by a feed pump, to supply the fuel to a delivery pipe.

The high pressure fuel pump 11 has a housing 12 and a cylinder 13, which is arranged in the housing 12. The cylinder 13 has a pressurizing chamber 14. A bracket 15 is fixed to the lower end of the housing 12 by a plurality of bolts 16. The cylinder 13 is supported by the bracket 15 and the housing 12. The cylinder 13 has a bore 13*a* that communicates with the pressurizing chamber 14 and extends axially. A plunger 17 is inserted in the bore 13*a* in an axially movable manner.

A guide cylinder 15*a* extends downward from the bottom surface of the bracket 15. A lifter 18, which is cylindrical and has a closed bottom, serves as a drive member is coupled and is fitted in the guide cylinder 15*a* in an axially movable manner. A basal end of the plunger 17, which projects from the cylinder 13, contacts an inner bottom surface of the lifter 18. A camshaft 22 of an engine is arranged below the lifter 18. A retainer 20 is engaged to a with the basal end of the plunger 17. A spring 21 is arranged between the retainer 20 and the bracket 15 in a compressed state. The spring 21 presses the basal end of the plunger 17 toward the inner bottom surface of the lifter 18 and urges the lifter 18 toward the camshaft 22.

The camshaft 22 has a cam (not shown) for driving a discharge valve of the engine and a drive cam 23 for driving the plunger 17. The drive cam 23 has two cam noses 23*a* separated from each other by an angular interval of 180 degrees. The spring 21 presses and the lifter 18 against the cam surface of the drive cam 23.

The cylinder 13 has a fuel supply passage 24 that communicates with the pressurizing chamber 14. An electromagnetic spill valve 25 is arranged in the fuel supply passage 24.

The electromagnetic spill valve 25 has an electromagnetic solenoid. When voltage is not applied to the electromagnetic solenoid, the electromagnetic spill valve 25 opens the fuel supply passage 24 to communicate the fuel supply passage 24 with the pressurizing chamber 14. In this state, when the plunger 17 is lowered and projected from the cylinder 13, low pressure fuel that is sent from a fuel tank (not shown) by the feed pump is drawn into the pressurizing chamber 14 via the fuel supply passage 24. When voltage is applied to the electromagnetic solenoid, the electromagnetic spill valve 25 closes the fuel supply passage 24 and disconnects the fuel supply passage 24 from the pressurizing chamber 14. In this state, when the plunger 17 is lifted and moved into the cylinder 13, the volume of the pressurizing chamber 14 decreases, which in turn, pressurizes the fuel in the pressurizing chamber 14.

A high pressure fuel passage 26 extends from the pressurizing chamber 14 through the cylinder 13 and the housing 12. A check valve 27 is arranged in the high pressure fuel passage 26. When the fuel pressure in the pressurizing chamber 14 exceeds a predetermined value, the check valve 27 is opened, and the high pressure fuel is supplied from the pressurizing chamber 14 to a delivery pipe (not shown) via the high pressure fuel passage 26. The high pressure fuel is further distributed from the delivery pipe to each fuel injection valve of the engine.

When the engine is driven, the drive cam 23 is rotated integrally with the camshaft 22 and the lifter 18 is reciprocated axially with respect to the guide cylinder 15*a* in accordance with the profile of the drive cam 23. The plunger 17 is reciprocated axially in cooperation with the lifter 18. As shown by the double-dashed line in FIG. 1, when the drive cam 23 is positioned at rotation position R1, the lifter 18 is moved to the lowest position where the lifter 18 is closest to the camshaft 22. In this state, the distal end 17*a* of the plunger 17 is moved to the lowest position where the distal end 17*a* is farthest from the pressurizing chamber 14 and the volume of the pressurizing chamber 14 is maximized.

When the drive cam 23 is rotated in the counterclockwise direction in FIG. 1 from rotation position R1 to rotation position R2, one of the cam noses 23*a* lifts the lifter 18. This projects the distal end 17*a* of the plunger 17 into the pressurizing chamber 14 and gradually decreases the volume of the pressurizing chamber 14. When the drive cam 23 is further rotated from rotation position R2 to rotation position R3, one of the cam noses 23*a* moves the lifter 18 to the highest position. In this state, the distal end 17*a* of the plunger 17 moves to the highest position where the volume of the pressurizing chamber 14 is minimized. In this manner, a fuel pressurizing stroke is performed when the drive cam 23 lifts the plunger 17.

In the pressurizing stroke, unless voltage is applied to the electromagnetic solenoid of the electromagnetic spill valve 25, the fuel in the pressurizing chamber 14 is not discharged to the delivery pipe and spilled into the fuel tank via the fuel supply passage 24. If voltage is applied to the electromagnetic solenoid at a proper timing during the pressurizing stroke, the electromagnetic spill valve 25 closes the fuel supply passage 24. Therefore, the fuel in the pressurizing chamber 14 is pressurized as the plunger 17 moves upward. The pressurized fuel pushes and opens the check valve 27 to be discharged into the delivery pipe. The fuel discharge amount is adjusted by changing the closing timing of the electromagnetic spill valve 25 during the pressurizing stroke. The electromagnetic spill valve 25 is controlled by an electronic control unit (not shown) arranged in the engine in accordance with running condition of the engine.

When the drive cam 23 is further rotated in the counterclockwise direction in FIG. 1 from rotation position R3, the urging force of the spring 21 gradually lowers the lifter 18 and the plunger 17 from the highest position. When the drive cam 23 is rotated to rotation position R1, the lifter 18 and the plunger 17 reaches the lowest position again. In this manner, when the drive cam 23 allows the plunger 17 to be lowered, a fuel intake stroke is performed.

When the lifter 18 and the plunger 17 reaches the highest position, the electronic control unit stops applying voltage to the electromagnetic solenoid of the electromagnetic spill valve 25. Therefore, the electromagnetic spill valve 25 remains opened during the intake stroke. The fuel sent from the fuel tank by the feed pump is drawn into the pressurizing chamber 14 via the fuel supply passage 24.

Afterward, the above-described pressurizing stroke and intake stroke are executed repeatedly and a proper amount of high pressure fuel is discharged from the high pressure fuel passage 26 to the delivery pipe.

As shown in FIG. 1, a coupling cylinder 13*b* extends downward from the lower end of the cylinder 13 and through the bracket 15. The coupling cylinder 13*b* forms part of the bore 13*a*. A generally cylindrical seal member 28 is fitted to and around the coupling cylinder 13*b*. The seal member 28 encompasses the portion of the plunger 17 projected from the plunger 17. The seal member 28 disconnects an inner space, or cylinder side space A1, which is encompassed by the seal member 28 from an outer space, or a lifter side space A2, which is defined outside the seal member 28. A slight amount of the fuel in the pressurizing chamber 14 leaks into the cylinder side space A1 through a clearance between the wall of the bore 13*a* and the peripheral surface of the plunger 17. Lubricating oil for lubricating the lifter 18 exists in the lifter side space A2. The seal member 28 prevents the fuel in the cylinder side space A1 from mixing with the lubricating oil in the lifter side space A2.

Figures 2A, 2B:
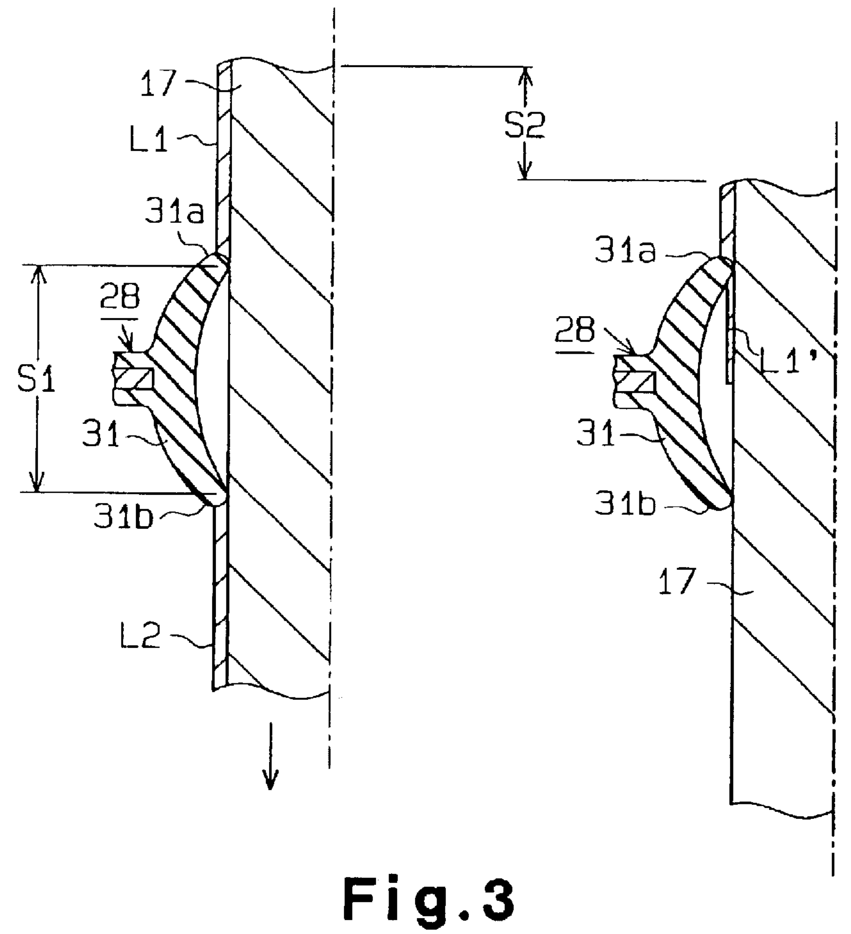
FIGS. 2(*a*) and 2(*b*) are enlarged cross sectional views showing a lip portion of a seal member of FIG. 1.

As shown in FIGS. 1, 2(*a*), and 2(*b*), the seal member 28 has a metal support cylinder 29 and a rubber seal 30, which is arranged along the inner surface of the support cylinder 29. An annular lip portion 31 defined at the lower end of the rubber seal 30 contacts the peripheral surface of the plunger 17. The lip portion 31 has an upper lip 31*a* and a lower lip 31*b*, which are separated from each other in the axial direction of the plunger 17. The edge of the upper lip 31*a* and the edge of the lower lip 31*b* are pressed against the peripheral surface of the plunger 17.

In this embodiment, the lip portion 31 is designed and formed so that an axial distance S1 between the upper lip 31*a* and the lower lip 31*b* is greater than stroke S2 of the plunger 17. More specifically, the distance S1 is the axial distance between the portion of the upper lip 31*a* contacting the peripheral surface of the plunger 17 and the portion of the lower lip 31*b* contacting the peripheral surface of the plunger 17.

When the plunger 17 is not moving, the upper lip 31*a* prevents the fuel L1 collected on the peripheral surface of the plunger 17 from entering the lifter side space A2, as shown in FIG. 2(*a*). The lower lip 31*b* prevents the lubricating oil L2 collected on the peripheral surface of the plunger 17 from entering the cylinder side space A1. Therefore, the fuel and the lubricating oil are prevented from mixing.

In the intake stroke, that is, when the plunger 17 is moves downward as viewed in FIG. 2(*a*), the fuel L1 collected on the peripheral surface of the plunger 17 is removed by the upper lip 31*a*. The removed fuel L1 is held in the cylinder side space A1 and prevented from entering the lifter side space A2. On the other hand, in the discharge stroke, that is, when the plunger 17 is moved upward as viewed in FIG. 2(*a*), the lubricating oil L2 collected on the peripheral surface of the plunger 17 is removed by the lower lip 31*b* and prevented from entering the cylinder side space A1.

When the plunger 17 is moved downward in the intake stroke, the fuel L1 that is not removed by the upper lip 31*a* remains on the peripheral surface of the plunger 17, as shown in FIG. 2(*b*). However, as described above, in this embodiment, the axial distance S1 between the upper lip 31*a* and the lower lip 31*b* is larger than the stroke S2 of the plunger 17. Therefore, when the plunger 17 moves from the highest position shown in FIG. 2(*a*) to the lowest position shown in FIG. 2(*b*), the residual fuel L1' does not pass by the lower lip 31*b* to enter the lifter side space A2. The residual fuel L1' only enters the space between the upper lip 31*a* and the lower lip 31*b*.

Although not shown in the drawings, when the plunger 17 moves upward in the discharge stroke, the lubricating oil that is not removed by the lower lip 31*b* remains on the peripheral surface of the plunger 17. However, in the same manner as described above, when the plunger 17 moves from the lowest position shown in FIG. 2(*b*) to the highest position shown in FIG. 2(*a*), the residual lubricating oil does not pass by the upper lip 31*a* to enter the cylinder side space A1. The residual lubricating oil only enters the space between the upper lip 31*a* and the lower lip 31*b*.

As described above, in this embodiment, the fuel L1' that is not removed by the upper lip 31*a* does not enter the lifter side space A2. Further, the lubricating oil that is not removed by the lower lip 31*b* does not enter the cylinder side space A1. This prevents fuel and lubricating oil from being mixed. Accordingly, dilution of the lubricating oil with the fuel is prevented, and satisfactory lubrication of the lifter 18 is maintained.

Figure 3:
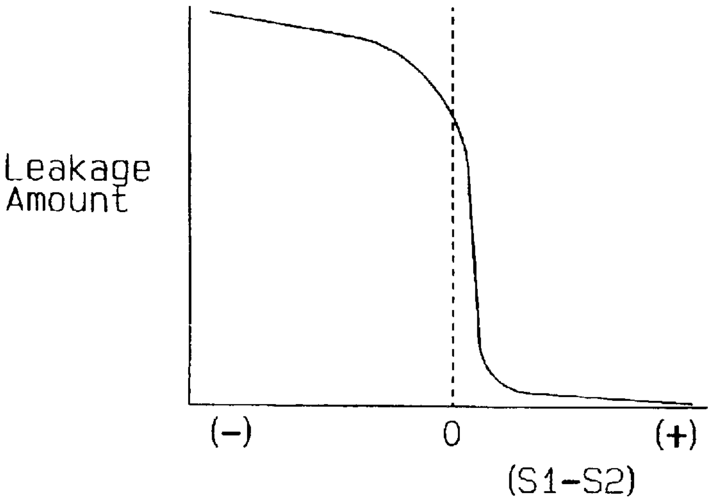
FIG. 3 is a graph showing the relationship of a leakage amount with respect to the difference between the distance between lips and a plunger stroke.
Figures 4A, 4B:
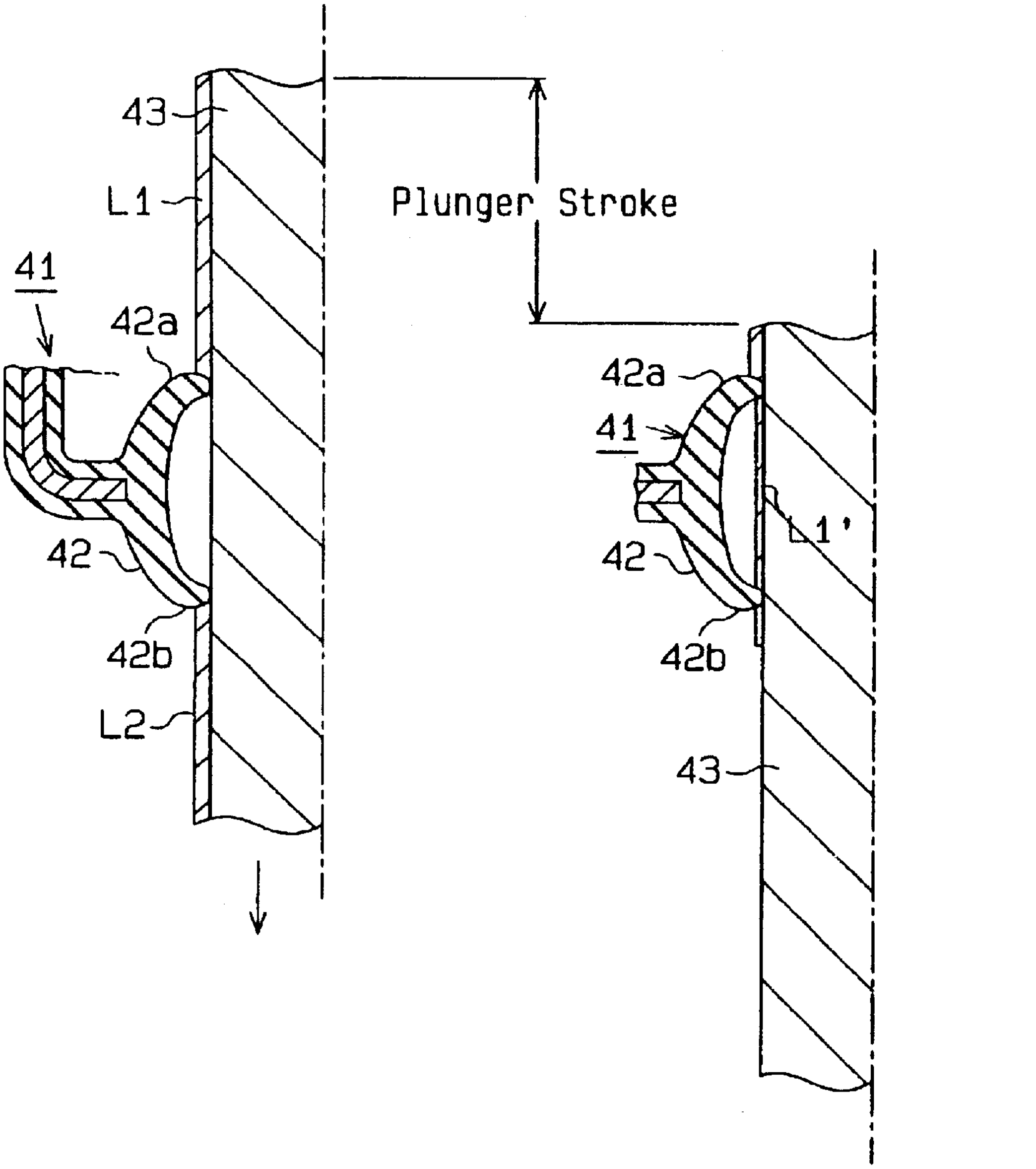
Fig.4(a) (Prior Art)
Fig.4(b) (Prior Art)
FIGS. 4(*a*) and 4(*b*) are cross sectional views showing a seal member of a prior art high pressure fuel pump.

FIG. 3 is a graph showing the relationship between the leakage amount of the fuel and the lubricating oil with respect to the difference between the distance S1 and the plunger stroke S2 (S1–S2). The result shown by the graph was obtained through experiments. As apparent from the graph, when the difference (S1–S2) is greater than a predetermined positive value, that is, when the distance S1 is greater than or equal to the plunger stroke S2 by a predetermined value, the leakage amount of the fuel and the lubricating oil is significantly decreased.

The seal member 28 has the metal support cylinder 29 and the rubber seal 30, which is arranged on the inner surface of the support cylinder 29. The support cylinder 29 faces the lifter side space A2 and is not exposed to the fuel in the cylinder side space A1. Therefore, even if low grade fuel that contains moisture exists in the cylinder side space A1, the metal support cylinder 29 does not rust.

The present invention may be embodied as follows.

The seal member 28 may not be attached to the housing 12 or the bracket 15 instead of the cylinder 13.

The support cylinder 29 may be embedded in the rubber seal 30. Alternatively, contrary to an arrangement shown in FIG. 1, the rubber seal 30 may be arranged around the support cylinder 29.

The application of the present invention is not limited to the high pressure fuel pump shown in FIG. 1 and but may be applied to a variety of high pressure fuel pumps. For example, in the pump of FIG. 1, the closing timing of the electromagnetic spill valve 25 during the pressurizing stroke is changed to adjust the fuel discharge amount. However, the present invention may be embodied in a high pressure fuel pump that adjusts the fuel discharge amount by changing the opening timing of the electromagnetic valve during the intake stroke.

The present invention may be also be embodied in a high pressure pump that pressurizes fluid other than fuel.

What is claimed is:

1. A high pressure pump comprising:

a cylinder having a pressurizing chamber;

a plunger inserted in the cylinder, wherein the plunger is axially reciprocated with a predetermined stroke to pressurize fluid in the pressurizing chamber, the plunger having a projected portion projected from the cylinder;

a drive member for driving the projected portion to reciprocate the plunger; and a seal member encompassing the projected portion, wherein the seal member has an annular lip portion that contacts a peripheral surface of the projected portion, the annular lip portion having a pair of lips separated from each other in an axial direction of the plunger, wherein the seal member disconnects an inner side space surrounded by the seal member from an outer side space outside the seal member, fluid that leaks from the pressurizing chamber exists in the inner side space, and lubricating oil that lubricates the drive member exists in the outer side space, and wherein each lip has a contact portion that contacts the peripheral surface of the projected portion, and an axial distance between the contact portions of the two lips is greater than the stroke of the plunger by a predetermined value so that a section of the peripheral surface of the projected portion that contacts one of the lips does not contact the other one of the lips when the plunger reciprocates.

2. The high pressure pump according to claim 1 wherein the seal member has a metal support cylinder and a rubber seal arranged on an inner surface of the support cylinder, and the annular lip portion is arranged on one end of the rubber seal.

3. The high pressure pump according to claim 1, wherein the cylinder has a coupling cylinder, the plunger projects out of the cylinder from the coupling cylinder, and the seal member is fitted to the coupling cylinder so as to surround the coupling cylinder.

4. A high pressure pump comprising:

a cylinder having a pressurizing chamber;

a plunger inserted in the cylinder, wherein the plunger is axially reciprocated with a predetermined stroke to pressurize fluid in the pressurizing chamber, the plunger having a projected portion projected from the cylinder;

a drive member for driving the projected portion to reciprocate the plunger; and a seal member encompassing the projected portion, wherein the seal member has an annular lip portion that contacts a peripheral surface of the projected portion, the annular lip portion having a pair of lips separated from each other in an axial direction of the plunger, wherein the seal member disconnects an inner side space surrounded by the seal member from an outer side space outside the seal member, fluid that leaks from the pressurizing chamber exists in the inner side space, and lubricating oil that lubricates the drive member exists in the outer side space, and wherein each lip has a contact portion that contacts the peripheral surface of the projected portion, and an axial distance between the contact portions of the two lips is greater than the stroke of the plunger by a predetermined value so that a section of the peripheral surface of the projected portion that contacts one of the lips does not overlap a section of the peripheral surface of the projected portion that contacts the other one of the lips when the plunger reciprocates.

5. The high pressure pump according to claim 4, wherein the seal member has a metal support cylinder and a rubber seal arranged on an inner surface of the support cylinder, and the annular lip portion is arranged on one end of the rubber seal.

6. The high pressure pump according to claim 4, wherein the cylinder has a coupling cylinder, the plunger projects out of the cylinder from the coupling cylinder, and the seal member is fitted to the coupling cylinder so as to surround the coupling cylinder.

* * * * *